Figure 1:
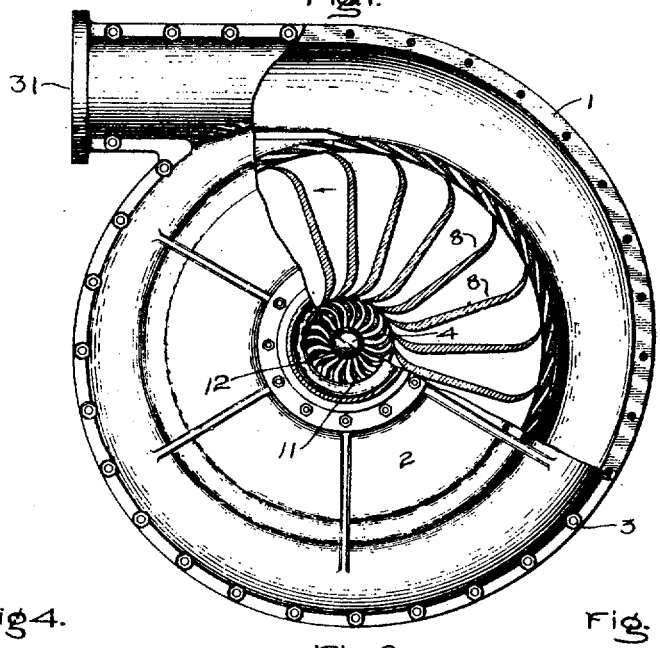

S. A. MOSS.

CENTRIFUGAL COMPRESSOR.

Reissued Dec. 30, 1913. APPLICATION FILED DEC. 2, 1913. 13,665.

2 SHEETS—SHEET 1.

Witnesses

Harold F. Locke.

Helen Orford

Indentor.

Sanford A. Moss

By Allen H. Dam Atty.

S. A. MOSS.

CENTRIFUGAL COMPRESSOR.

Reissued Dec. 30, 1913.

APPLICATION FILED DEC. 2, 1913.

13,665.

2 SHEETS—SHEET 2.

Witnesses:
Harold F. Locke.
Helen Oxford

Indentor;
Sanford A. Moss.
By Albert G. Davis
Att'y.

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

CENTRIFUGAL COMPRESSOR.

13,665. Specification of Reissued Letters Patent. Reissued Dec. 30, 1913.

Original No. 1,075,300, dated October 7, 1913, Serial No. 236,272. Application for reissue filed December 2, 1913. Serial No. 804,166.

*To all whom it may concern:*

Be it known that I, SANFORD A. MOSS, a citizen of the United States, residing at Lynn, county of Essex, State of Massachusetts, have invented certain new and useful Improvements in Centrifugal Compressors, of which the following is a specification.

The present invention has for its object to improve the efficiency and construction of centrifugal compressors, as will be more fully set forth hereinafter.

In carrying out my invention a compressor having one, two or more stages is provided. When it is desired to furnish air or other gas at relatively high pressure, the discharge conduit of one compressor or stage is connected to the inlet conduit of another compressor or stage, and so on. When it is desired to furnish compressed air or other gas at relatively low pressure but in relatively large quantities, the stages of the compressor may be arranged to discharge in multiple. The rotary elements may all be mounted on the same or different shafts, and be driven by one or more sources of power. The construction of the compressors is similar except that the cross-sectional area of the working passages, or passages between the blades in the first or low pressure compressor, is somewhat greater than that of the passages in the second or higher pressure compressor, the cross-sectional area of the passages in the succeeding compressors gradually decreasing as the pressure of the fluid increases. Each revolving element is mounted on a suitable shaft, supported in one or more bearings in the compressor casing or on separate supports. The said element is provided with a number of radial vanes or blades having sharpened ends arranged to properly receive and discharge the fluid undergoing compression. As the element rotates, the air or other elastic fluid is discharged outwardly, due to centrifugal force. The blades or vanes mounted on the impeller may be closed in at the sides by plates which rotate therewith, or the walls of the stationary casing may be employed to complete the sides of the air-conveying passages. When the former arrangement is provided the clearances between the rotating and stationary walls of the casing should be small, and preferably means employed to keep down the leakage. The direction or angle of entrance of the air or gas to be compressed into the wheel or impeller is an important feature. The fluid should be delivered to the rotating blades or vanes in a plane at right angles, or substantially so, to the axis of rotation. To accomplish this, stationary directing vanes are employed which extend toward a common point at their receiving end, and at their discharge ends are situated in close proximity to the receiving ends of the rotating blades. If the impeller speed is such that the pressure accruing through the conversion of velocity into pressure is less than twice the pressure at the periphery of the impeller, the nozzle required to properly bring the air to rest will be wholly divergent, considered from the impeller outward. In this case the pressure variation is so slight that the specific volume does not change greatly. If however the impeller speeds are very high, then the pressure due to the conversion of the velocity may be such that the pressure in the scroll or discharge conduit is more than twice the pressure at the periphery of the impeller. In such cases the nozzle, to properly bring the air to rest, must first converge and later diverge. This is due to the fact that in the anterior or converging portion of the nozzle the velocity does not decrease very rapidly, while, on the contrary, the pressure increases rapidly. In order to take care of the decrease in velocity only, the nozzle should diverge, but owing to the fact that the increase in pressure is accompanied by a decrease in volume, provision must be made therefor by making the anterior portion of the nozzle converge. To state the matter in a different way, the velocity decreases so slowly compared to the reduction in volume due to the increase in pressure that the anterior portion of the nozzle must gradually reduce in cross-sectional area. In the posterior or diverging portion of the nozzle the velocity decreases very rapidly, and in order to make provision for this the walls must diverge very rapidly. In this portion therefore the contraction of the air due to increase of pressure does not exercise a very marked influence. Therefore, in order to make the proper provision for both the velocity action and the contraction action, the posterior portion of the nozzle must be wholly divergent. The nozzle may be divided by partitions into sections or not as desired. Whether the nozzle is or is not divided into sections the separate streams of fluid delivered from the vane spaces will be received by it and the velocity at once converted into pressure. It will be seen that the conversion from velocity to pressure takes place immediately after the maximum velocity is created instead of at some distant point, which results in a loss in efficiency. When a compressor or a stage of a multi-stage compressor is intended to produce only a relatively small increase in pressure, it is unnecessary to provide the nozzle with converging walls on the receiving or anterior portion, but where higher pressures are to be produced it is necessary, in order to obtain the best results, to use them. This applies whether the nozzle is subdivided into sections or not. Surrounding the nozzle and formed in the casing, or otherwise suitably supported and connected, is a scroll or discharge pipe which gradually increases in cross-sectional area to accommodate the increased amount of fluid due to the amounts discharged by the vane spaces. The cross-sectional area of the scroll pipe should be such as to retain the fluid in its compressed state.

Figure 4:
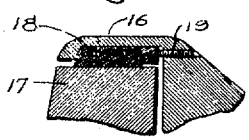
Figure 2:
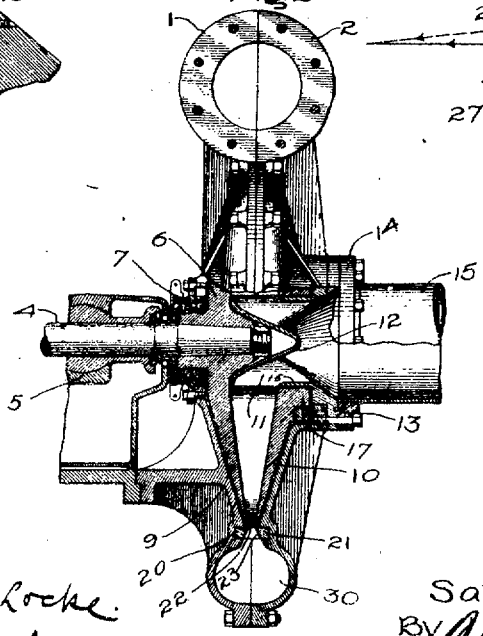
Figure 3:
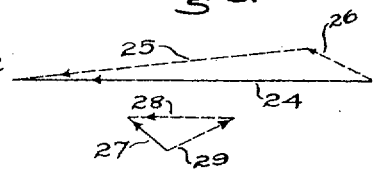
Figure 5:
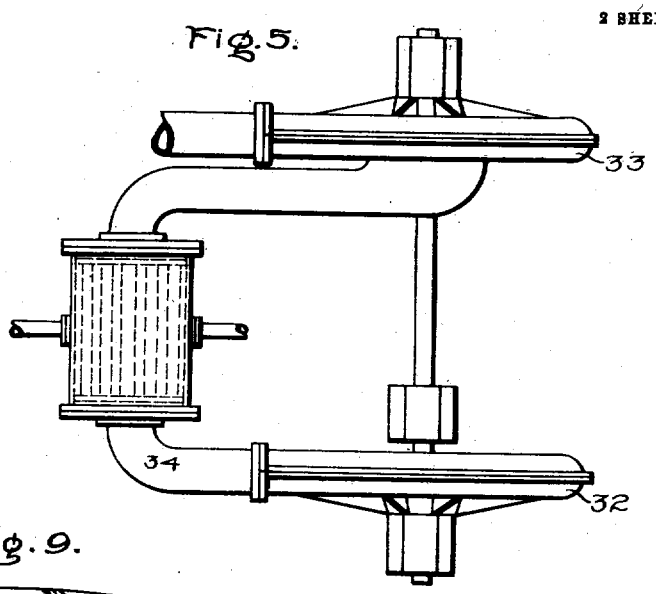
Figure 9:
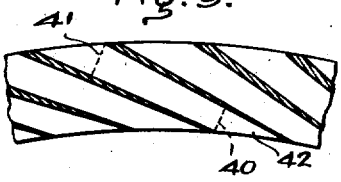
Figure 6:
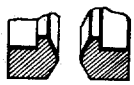
Figure 7:
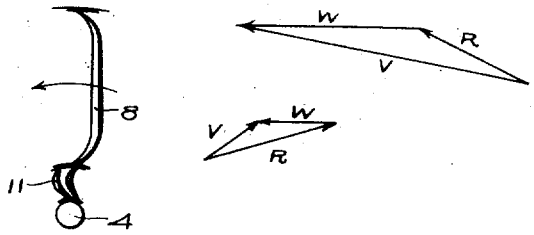
Figure 8:
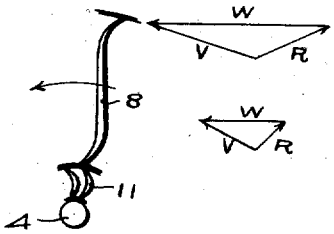

In the accompanying drawings, which illustrate certain embodiments of the invention, Figure 1 is a view in elevation of a centrifugal air compressor with certain of the parts broken away to show the construction of the vanes and nozzle; Fig. 2 is a view taken at right angles to that of Fig. 1, with certain of the parts broken away to show the internal construction; Fig. 3 is a diagram representing the velocities of the fluid passing through the passages between the directing vanes, and also the velocity of the fluid passing through the vane spaces on the rotating element; Fig. 4 is a detail view of a packing employed between the rotating and stationary parts; Fig. 5 shows the invention applied to a multi-stage compressor having two or more stages; Fig. 6 is a detail view of a nozzle having converging and diverging portions; Figs. 7 and 8 are diagrammatic views of impeller blades and velocity diagrams, and Fig. 9 is an enlarged view of the nozzle shown in Fig. 1.

The casing for the compressor is made up of two principal parts 1 and 2 which are flanged and secured together by the bolts 3.

4 represents the main shaft, which is supported in a suitable bearing 5 and carries the revolving element 6. The revolving element is keyed or otherwise secured to the shaft. Its hub is finished off true, and surrounding it is an adjustable packing 7. The rotating element is provided with a plurality of vanes 8, which may be curved at their ends and between said vanes are passages that diverge outwardly as shown. The object in curving these vanes at the ends is to cause them to receive and discharge the air or other fluid at the most effective angle. The sides of the vanes are covered by plates or walls 9 and 10, Fig. 2, which serve to confine the fluid undergoing compression in the separate vane spaces. However I may omit these walls and have the vanes extend to the casing. The wall 9 forms a continuation of the supporting hub and it may or may not be formed integral therewith. The wall 10 may be formed integral with the vanes or be attached thereto with suitable bolts or other retaining devices. It is provided with an enlarged central opening, concentric with the axis of rotation, within which are located the directing vanes 11 and the shield 12. The shield is conical in form and, as shown, covers the end of the shaft and hub of the rotating element. The directing vanes 11, at their receiving ends, form an angle of about 45° with the axis of rotation, while the discharge ends are parallel with the shaft and are surrounded by the inner ends of the blades on the rotating element. By means of this construction the incoming fluid is prevented from striking the rotating part of the wheel or impeller until it is delivered to the vanes 8, which, by their centrifugal action, simultaneously increase the velocity and pressure of the fluid. In the particular compressor shown in Figs. 1 and 2, approximately one-half of the pressure of the fluid discharged is due to the centrifugal action of the wheel itself, and the remainder to the action of the nozzle.

The vanes 11, the shield 12, and the flange 13 of the part 2 should be as smooth as possible in order to permit the air to freely enter the vane spaces in the rotating element, and this without undue losses due to eddies, etc. To the flange 13 of the casing is bolted a flange 14 which receives the screw-threaded end of the conduit 15. The conduit 15 may be connected with any suitable source of supply, such as the atmosphere, a tank or the discharge end of another compressor.

I have found in actual practice that in some cases there is a tendency for the fluid passing through the vane spaces to leak between the wall 10 and the revolving element and the casing, and reënter the vane spaces. If this leakage is excessive, a packing may be employed, such as shown in Fig. 4, wherein 16 represents a cylindrical extension of the casing to which the stationary directing vanes are attached, and 17 the hub-like portion on the right hand side, Fig. 2, of the rotating element. Between the parts 16 and 17 a chamber is formed to receive the soft packing 18, which is adjusted by means of a suitable gland and adjusting bolts 19.

The parts of the main casing are provided with cylindrical shoulders or grooves 20 to receive the nozzle 21. In the present instance the nozzle is shown as being provided with a plurality of sections or passages. The nozzle should be provided with a throat or point of restriction 22 and diverging side walls 23. By reason of the divergence of the walls of the nozzle or of the sections of nozzle, where such sections are employed, the velocity of the fluid received from the rotating element is converted into pressure. These passages extend tangentially or substantially so to the path of the outer ends of the moving vanes. The passages between the partitions should be relatively long with respect to their width so as to properly direct the fluid particles, and also to cause the fluid to be compressed as it passes through them. By this I mean that the distance between the dotted line 40 of Fig. 9 and the dotted line 41 is much greater than the distance between the side walls measured at any point in a plane perpendicular to the direction of the flow of the fluid. The portion 42 of the nozzle between the sharpened inlet edges of the partitions serves to collect or gather the fluid particles preparatory to discharging them into the nozzle proper. The effective action of the nozzle in compressing the fluid, reducing its velocity to a negligible amount and increasing its temperature and density takes place in the nozzle between the dotted lines 40 and 41.

In Fig. 3, 24 of the larger diagram represents the absolute velocity of the air at the point of entrance to the nozzle with respect to earth; 25 the velocity of the wheel; and 26 the relative velocity of the air passing through the wheel. Referring to the smaller diagram of Fig. 3, 27 represents the absolute velocity of the fluid entering the wheel; 28 the velocity of the wheel at the point of entrance; and 29 the relative velocity of the air with respect to the vanes 8. The fluid discharged by the nozzle or nozzle section is collected in the scroll pipe 30 which is formed in the casing. This scroll pipe gradually increases in cross-sectional area from one end to the other, and finally terminates in a flanged conduit 31, always, however, retaining the fluid in its compressed state.

Referring to Fig. 5, two air compressors or stages 32 and 33 are shown, which are alike in all substantial respects. 32 represents the first or low pressure compressor, and 33 represents the second or higher pressure compressor. The compressor 32 receives air or other fluid from the conduit in the same manner as is shown in Fig. 2. The fluid discharged therefrom is collected in the scroll pipe and is discharged into the conduit 34, the latter being connected with the inlet of the compressor 33. Between each two compressors I may employ an intercooler 35 of suitable construction to reduce the temperature of the air or other gas undergoing compression. The present intercooler comprises a casing containing gas-carrying tubes, and pipes conveying a cooling fluid to and away from the casing. I may employ a greater number of stages in the air compressors and between some or all of the stages intercoolers may be provided.

In Figs. 1 and 2 a nozzle is shown which is wholly divergent. This is suitable for comparatively low impeller speeds. In order to have exactly the same nozzle action for great impeller speeds, a nozzle first convergent and then divergent should be substituted, as shown in Fig. 6. I therefore do not limit myself in this particular, and use that form of nozzle which calculation and experiment show is best suited for each case. This nozzle is not provided with partitions as shown in Fig. 1, but they may be provided if desired. To state this matter in another way, I have found that a compressible fluid discharged from an impeller and compressed by a certain amount due to centrifugal action, and at a certain temperature $T_3$ due to this compression, and with a certain velocity $V_3$ due to part of the energy input of impeller can be further compressed by means of a stationary nozzle as already described, if the cross section of the stream is properly varied in the direction of flow of the fluid along it. I have found that there is a certain critical velocity, $V_c$, which can be computed according to the formula—

$$V_c = \sqrt{gkRT_3}$$

$V_c$=Critical velocity ft. per sec.

$g$=Acceleration due to gravity, ft. per sec. per sec.

R=Gas constant in well known formula $pv$=RT where $p$ is in lbs. per sq. ft., $v$ is in cu. ft. per lb. and T is absolute Fahr. temperature.

$k$=Ratio of specific heats at constant pressure and constant volume.

$T_3$=Abs. Fahr. temperature at impeller exit.

In cases where it is desirable to make the impeller exit velocity $V_3$ in ft. per second greater than the critical velocity $V_c$ as above computed a nozzle is provided which will conduct the stream so that its cross section is first gradually decreased until a point is reached where the velocity has been reduced to the critical velocity. There will be a certain amount of compression produced by the flow along the nozzle to this point beyond that produced by the impeller. The nozzle is arranged so as to gradually increase the cross section of the stream beyond this point. There is thereby produced further compression. In cases where it is desirable to make the impeller exit velocity $V_3$ in feet per second, less than the critical velocity $V_c$ as above computed there is provided a nozzle which will conduct the stream so that its cross section is always gradually increased. This compresses the fluid beyond the amount accomplished by the impeller. In all cases it is assumed that the impeller wheel receives the air at a point of comparatively small diameter and discharges it at a point of greater diameter. The exact ratio of diameters is not essential. By having the inner diameter of the wheel at the point where the air is received of a greater or less ratio to the outer diameter, the relative degree of compression due to centrifugal action and to nozzle action is altered. I therefore do not limit myself to any particular ratio of diameters. The compression due to centrifugal action and nozzle action is also affected by the direction in which the vanes of the inlet guide are turned, and also by the direction in which the beginning and ending of the impeller vanes are turned. For instance, if the angles and velocity diagrams are as shown in Fig. 7, the absolute velocity V of the air in space upon leaving the impeller will be very great. On the contrary, if the angles are as indicated by Fig. 8, the velocity V of the air leaving the wheel will be much less. That is to say, the pressure due to nozzle action will be much greater for the arrangement shown in Fig. 7 than for the arrangement shown in Fig. 8. In Figs. 7 and 8, W of the larger diagrams indicates the velocity of the impeller, V the absolute velocity of the air leaving the impeller, and R the velocity of the air relative to the impeller. The difference in the relative velocity indicated by V and R in the two figures is due to the curvature at the discharge ends of the vanes. In the smaller diagram, W indicates the velocity of the receiving ends of the impeller vanes relatively to the stationary guide vanes, V the absolute velocity of the air leaving the guide vanes and entering the impeller, and R the relative velocity of the air with respect to the guide vanes. The smaller diagrams in Figs. 7 and 8 represent the velocity of the air passing through the directing vanes. Various relative effects can be secured by various other combinations of angles of the inlet guide and of the beginning and end of the impeller vanes, and I do not, therefore, limit myself in this particular. In Fig. 7 the velocity of the air relative to the impeller is shown to be the same at the entrance and exit. This is accomplished by having the total area of the passages by which the air leaves the wheel somewhat smaller than the passages by which it enters, to make up for the contraction due to the increase in pressure from centrifugal action. However, other combinations are possible. For instance, the passages and vane angles may be so arranged that the air enters the impeller wheel at a great velocity and leaves it at a smaller velocity. There would then be conversion of velocity into pressure along the impeller wheel, so that the pressure at the periphery of the impeller would be greater than that due to centrifugal action only. In order to secure increase of pressure by this action, it is necessary to have the air enter the impeller at a great velocity.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out in other ways.

What I claim as new and desire to secure by Letters Patent of the United States, is,

1. In a centrifugal compressor for elastic fluids, the combination of a casing, a rotating impeller mounted therein which is provided with radially disposed vanes having outwardly diverging passages between them, which vanes and passages confine the fluid and simultaneously impart velocity to the fluid and compress it by reducing its volume, directing vanes arranged to direct the incoming fluid against the inner ends of the impeller vanes, an annular nozzle located in the plane of the impeller which surrounds the outer ends of the vanes and is provided with tangential partitions and walls that decrease the velocity of the fluid to a predetermined small amount, and also further decrease the volume and increase its density before discharging it, and a conduit that surrounds the nozzle and receives fluid from it and retains the same in its compressed state.

2. In a centrifugal compressor, the combination of a rotating element which is provided with vanes shaped to simultaneously impart velocity to the fluid and compress it, directing vanes which direct the incoming fluid against the inner ends of the vanes on the rotating element in a direction perpendicular to the axis of rotation, a shield which assists in directing the incoming fluid and prevents it from striking that portion of the wheel within the inner ends of the vanes, a nozzle which surrounds the outer ends of the vanes and is provided with walls that decrease the velocity of and also the volume of the fluid and increase its density and temperature, and a discharge conduit which receives fluid directly from the nozzle and retains it in its compressed state.

3. In a centrifugal compressor for elastic fluid, the combination of an impeller which is provided with radial passages that gradually increase in cross-sectional area toward the point of discharge and simultaneously impart velocity to the fluid and compress it, a casing for the impeller, an annular nozzle that closely surrounds the impeller, is located in the plane thereof and receives the elastic fluid discharged by it, thin partitions in the nozzle that extend tangentially toward the periphery of the impeller and form passages of definite size and shape for directing the fluid streams, the said passages enlarging gradually on the discharge sides by an amount sufficient to reduce the velocity of the fluid to a small value, at the same time compress it and increase its density, which compression is added to that due to the impeller, a conduit that surrounds the nozzle and receives the fluid from all of said passages and holds it in a compressed state, and a means for reducing the tendency of the fluid to cause eddies as it enters the impeller.

4. In a centrifugal compressor, the combination of a rotary vane-carrying element, a casing therefor, means for directing the incoming fluid into the receiving ends of the vane spaces of the rotating element, an annular nozzle which surrounds the rotating element and is located in the plane of said element, straight walled partitions in the nozzle extending in the direction of flow of the fluid to form passages, each passage being provided with a restricted throat and posterior diverging walls which compress the fluid and reduce the velocity thereof and increase its density and temperature prior to discharging it, a plurality of means that coöperate with the rotary vanes to direct the incoming fluid thereto, and a conduit which receives the fluid after it is discharged by the passages, at the same time preventing it from expanding.

5. In a centrifugal compressor, the combination of a rotating element, vanes or blades thereon which extend radially and have their ends curved forward to discharge the fluid with high velocity relative to the impeller, stationary vanes for directing the passage of fluid into the vane spaces of the rotating element, which are also curved at the ends, the discharge ends of the directing vanes being surrounded by the receiving ends of the rotating vanes, a nozzle having a passage which expands from the throat to the discharge end, and a conduit receiving fluid from the discharge end of the nozzle.

6. In a centrifugal compressor, the combination of a casing, a rotating element mounted therein, blades for the rotating element which are curved at the ends in the direction of rotation, and vanes or blades for directing the fluid entering the rotating element, the said blades being curved at the ends in a direction opposite to those of the rotating element.

7. In a centrifugal compressor, the combination of an impeller having blades shaped to simultaneously impart velocity to the fluid and compress it, an annular nozzle which surrounds the peripheral ends of the blades and receives the fluid therefrom, the said nozzle having diverging side walls and straight sided tangential partitions to form passages each with a restricted inlet and an enlarged outlet, the length of the passage being considerably greater than the width at any point measured in a plane perpendicular to the direction of flow of the fluid so that the fluid will be compressed in the passage, will have its velocity reduced to a predetermined small amount and its temperature increased, a casing for the nozzle and impeller, and an inlet and an outlet.

8. In a centrifugal compressor, the combination of a casing, a rotating impeller mounted therein and having radially disposed vanes shaped to simultaneously impart velocity to an elastic fluid and compress it by centrifugal force and to discharge it peripherally with the velocity and reduced volume unimpaired into the nozzle, an annular nozzle that surrounds the impeller and receives the fluid directly from it, said nozzle having partitions extending in the general direction of rotation and in the plane of the impeller which form tangentially arranged definite passages that receive fluid from the impeller, and are of properly varying cross-section in the direction of their length to diminish the velocity of the fluid as received from the impeller and cause additional compression and discharge the same with a relatively low residual velocity, a conduit means common to the said nozzle passages that receives the fluid and retains it in its compressed state, and a discharge conduit.

9. In a centrifugal compressor for elastic fluids, the combination of a casing, a rotating impeller mounted therein having vanes with passages between them shaped to decrease the velocity of the elastic fluid relative to the impeller and cause compression of the fluid in addition to the compression caused by the centrifugal action of the said impeller, an annular nozzle that surrounds the impeller in the plane thereof, and has a passage of properly varying cross-section in the direction of the stream lines, said nozzle receiving and directing the fluid, diminishing its velocity and causing additional compression and discharging it with a relatively low residual velocity, a conduit receiving the fluid from the nozzle, and a second conduit which supplies the fluid to the inlet ends of the impeller vanes.

10. In a centrifugal compressor for elastic fluids, the combination of a casing, a rotating impeller mounted therein and having vanes for compressing and imparting velocity to the elastic fluid, said vanes receiving fluid at their inner ends and discharging it outwardly, a driving shaft for the impeller, an annular nozzle into which the impeller discharges which has a passage of properly varying cross-section in the direction of the stream lines with its largest cross-section at the point of final discharge, said nozzle receiving, guiding and directing the elastic fluid from the impeller and also compressing and discharging it with relatively low residual velocity, and means for conveying elastic fluid to the inlet ends of the vanes.

11. In a compressor for elastic fluids, the combination of a casing, a rotating impeller mounted therein and having vanes for compressing and imparting velocity to the elastic fluid, a driving shaft for the impeller, an annular nozzle into which the impeller discharges throughout its entire circumference, said nozzle having a passage which is wholly divergent in the direction of the stream lines with its largest cross-section at the point of final discharge, and receiving, guiding and directing the elastic fluid received from the impeller and also compressing and discharging it with relatively low residual velocity, and means admitting elastic fluid to the inlet ends of the vanes.

In witness whereof I have hereunto set my hand this seventh day of December, 1904.

SANFORD A. MOSS.

Witnesses:
JOHN A. MCMANUS, JR.,
DUGALD MCK. MCKILLOP.